United States Patent
Dries et al.

(10) Patent No.: US 6,749,933 B2
(45) Date of Patent: Jun. 15, 2004

(54) PACKAGING MATERIAL MADE OF BIAXIALLY ORIENTED POLYOLEFIN FILM

(75) Inventors: Thomas Dries, Schwabenheim (DE); Wolfgang Eiser, Blieskastel (DE)

(73) Assignee: Trespaphan GmbH, Neunkirchen (DE)

( * ) Notice: Subject to any disclaimer, the term of this patent is extended or adjusted under 35 U.S.C. 154(b) by 0 days.

(21) Appl. No.: 10/168,224

(22) PCT Filed: Jan. 23, 2001

(86) PCT No.: PCT/EP01/00696

§ 371 (c)(1), (2), (4) Date: Jun. 19, 2002

(87) PCT Pub. No.: WO01/54895

PCT Pub. Date: Aug. 2, 2001

(65) Prior Publication Data

US 2003/0003296 A1 Jan. 2, 2003

(30) Foreign Application Priority Data

Jan. 26, 2000 (DE) .......................................... 100 03 423

(51) Int. Cl.$^7$ ............................. B32B 5/16; B32B 27/32
(52) U.S. Cl. ...................... 428/328; 156/69; 156/272.8; 156/305.6; 156/308.4; 428/319.7; 428/319.9; 428/329; 428/332; 428/336; 428/516; 428/910

(58) Field of Search ................................. 156/69, 272.8, 156/305.6, 308.4; 428/319.7, 319.9, 328, 329, 336, 516, 910, 332

(56) References Cited

U.S. PATENT DOCUMENTS 3,769,117 A * 10/1973 Bowen et al. ................. 156/69
5,716,698 A * 2/1998 Schreck et al. ............. 428/323

FOREIGN PATENT DOCUMENTS

| DE | 30 05 051 A1 | 8/1981 |
| DE | 195 16 726 A1 | 11/1996 |
| GB | 1 384 144 A | 2/1975 |

* cited by examiner

Primary Examiner—D. S. Nakarani
(74) Attorney, Agent, or Firm—ProPat, L.L.C.

(57) ABSTRACT

The invention relates to a packaging material made of a multilayer oriented polyolefin film, which comprises a base layer and at least one first outer layer, whereby the first outer layer is placed in contact with itself or in contact with the opposing surface of the film or in contact with the surface of another film. This first outer layer contains an additive which absorbs light within the wavelength range of a laser such that when the film is locally irradiated by the laser, the area of irradiation experiences an increase in temperature that causes the polyolefin of the first outer layer to soften or melt in the irradiated area and to bond to another layer when cooled.

20 Claims, No Drawings

PACKAGING MATERIAL MADE OF BIAXIALLY ORIENTED POLYOLEFIN FILM

The invention relates to packaging made of a biaxially oriented polyolefin film.

Polyolefin films are widely used as packaging films. The success of these materials is based on the good optical and mechanical properties and on the simple weldability of the films. Besides welding, heat-sealing of films has increased in importance. Heat-sealable films have an outer layer of a polymer which has a lower crystallite melting point than the polymer of the base layer. For heat-sealing, the film layers are laid one on top of the other and warmed to only from 10 to 20° C. below the crystallite melting point, i.e. the outer layers are not completely melted. The adhesion of the heat-sealing layers which is achieved is significantly less than in the case of welding of the same material, but is sufficient for many applications (Kunststoff-Handbuch [Plastics Handbook], Volume IV, Carl Hanser Verlag, Munich, 1969, pages 623 to 640).

Besides the use of heat-sealable layers, the application of so-called cold-sealing layers is known. Cold-sealing layers are used, in particular, where heat-sensitive package contents, such as, for example, chocolate, are packaged in film. The application of cold-sealing layers is an additional processing step which considerably increases the costs for a package.

Independently of these packaging technologies, such as welding, heat-sealing or cold-sealing, processes for marking polymeric materials have been developed in recent years. Materials of this type contain a radiation-sensitive additive which causes a colour change in the material on exposure to radiation in certain wavelength ranges. Suitable additives for this application are, for example, laser pigments.

In addition, the prior art discloses processes for joining plastic components by means of lasers, in which the thermal and mechanical load on the components is low. For many applications, transmission laser welding has become established. In this method, the laser beam passes through a transparent component unhindered and hits the laser-absorbent join partner. The action of the laser beam causes the plastic of the absorbent partner to melt at the surface and join to the join partner on cooling. In this process, diode lasers or solid-state lasers having wavelengths in the near infrared region are employed.

The object of the present invention therefore consisted in providing packaging made of a polyolefin film which avoids the disadvantages of cold-sealing coating, but is equally suitable for the packaging of heat-sensitive products.

This object is achieved by packaging made of a multilayered, oriented polyolefin film which comprises a base layer and at least one first outer layer, where this first outer layer is in contact with itself or in contact with the opposite surface of the film or in contact with the surface of a further film, characterized in that the film comprises in this first outer layer an additive which has an absorption in the wavelength range of a laser such that, on local irradiation of the film with this laser, a temperature increase occurs in the area of the irradiation such that the polyolefin of the first outer layer softens or melts in the irradiated area and bonds to a further layer on cooling. The subclaims indicate further embodiments of the invention.

A further object of the present invention consisted in indicating advantageous packaging comprising a container with lid.

This object is achieved by packaging made of a multilayered, oriented polyolefin film which comprises a base layer and at least one first outer layer, where the polyolefin film comprises in the first outer layer an additive which has an absorption in the wavelength range of lasers such that, on local irradiation of the film with a laser, a temperature increase occurs in the area of the irradiation such that the polyolefin of the first outer layer softens or melts therein in the irradiated area and bonds to a further layer on cooling.

Besides the laser-absorbent pigment, the outer layer of the film generally comprises at least 80% by weight, preferably from 85 to <100% by weight, in particular from 90 to 98% by weight, in each case based on the layer, of a polyolefin.

Examples of suitable olefinic polymers of the outer layer are propylene homopolymers ethylene homopolymers copolymers of
  ethylene and propylene or
  ethylene and 1-butylene or
  propylene and 1-butylene or terpolymers of
  ethylene and propylene and 1-butylene or a mixture or blend of two or more of the said homopolymers, co-polymers and terpolymers, particular preference being given to random ethylene-propylene copolymers having
  an ethylene content of from 1 to 10% by weight, preferably from 2.5 to 8% by weight, or random propylene-1-butylene copolymers having
  a butylene content of from 2 to 25% by weight, preferably from 4 to 20% by weight, in each case based on the total weight of the copolymer, or random ethylene-propylene-1-butylene terpolymers having
  an ethylene content of from 1 to 10% by weight, preferably from 2 to 6% by weight, and a 1-butylene content of from 2 to 20% by weight, preferably from 4 to 20% by weight, in each case based on the total weight of the terpolymer, or a blend of an ethylene-propylene-1-butylene terpolymer and a propylene-1-butylene copolymer
  having an ethylene content of from 0.1 to 7% by weight and a propylene content of from 50 to 90% by weight and a 1-butylene content of from 10 to 40% by weight, in each case based on the total weight of the polymer blend.

The above-described copolymers and/or terpolymers employed in the outer layer generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the above-mentioned melt flow indices are measured at 230° C. and a force of 21.6 N (DIN 53 735).

The propylene homopolymers employed in the outer layer generally have a melt flow index of from 1.5 to 30 g/10 min, preferably from 3 to 15 g/10 min. The melting point of the homopolymers is in the range from 150 to 170° C., preferably from 155 to 165° C. Preference is given to isotactic homopolymers whose isotacticity is greater than 92%, preferably in the range from 94 to 98%. The n-heptane-soluble content of the isotactic propylene homopolymers is less than 10% by weight, preferably from 1 to 8% by weight, based on the weight of the homopolymer. All the above-mentioned melt flow indices are measured at 230° C. and a force of 21.6 N (DIN 53 735).

If desired, conventional additives, such as antistatics, neutralizers, lubricants and/or stabilizers, and, if desired, additionally antiblocking agents in effective amounts in each case may be added to the outer layer(s).

It is essential to the invention that the absorbent outer layer of the film comprises an additive which absorbs radiation in the wavelength range of lasers. Additives of this type are referred to below for the purposes of the present invention as pigments or laser pigments.

The incorporation of laser pigments of this type into the outer layer of the film results in absorption of the radiation, i.e. a take-up of energy, on irradiation of the film. It is known in the prior art that, given an appropriate wavelength, the laser beam leaves behind a visible track in the form of a white or coloured line in the pigmented plastic. This effect is utilized for marking plastic components and plastic films by means of a laser. As part of the present invention, it has now been found that irradiation of films laid one on top of the other by means of a laser beam produces a strong connection between the two film layers, in a similar manner to a heat-seal or weld seam, if at least one of the two films has a laser pigment-containing outer layer and this laser pigment-containing layer is facing the second films in such a way that the pigmented outer layer is in contact with the second film layer. It has been found here that it is particularly advantageous for the production of a seal seam for both outer layers in contact to comprise a corresponding, preferably the same, absorbent pigment.

Surprisingly, the laser beam passes through the other layers of the film without leaving behind visible tracks there, as is known from laser marking, and without leaving behind other damage. It was unexpected that the laser absorption would be so pronounced that the film absorbs sufficient energy for softening or warming of the outer layer. In particular, it was questionable whether the absolute amount of laser pigments in the thin outer layer would be sufficient to facilitate uniform melting of the outer layer through absorption. At the same time, it has been found that the warming or melting of the outer layer remains restricted very locally to the irradiated area. This makes it possible, for the production of packaging, to incorporate a lasered seal seam specifically where this seam is desired.

Thermal loading of the packaged product by the laser beam is advantageously avoided here. The new technology is therefore suitable for replacing known cold-sealing coatings for the packaging of heat-sensitive products.

The laser pigment-containing outer layer may be applied both to opaque and transparent films known per se, or to their base layer or interlayer. For opaque or white films, it was particularly surprising that the fillers of the other layers, which serve for opacification or white coloration of the film, do not hinder absorption of the laser radiation in the pigmented outer layer and warming of the laser pigment-containing outer layer. The absorption in the filler- and/or pigment-containing layers is so low, or does not occur, that no impairment of the laser sealing or film integrity or the other film properties by the laser beam has been noted.

For the purposes of the present invention, laser pigments are incompatible particles which are inert towards the matrix polymer and do not result in any significant vacuole formation during stretching. The mean particle size of the laser pigments is generally in a range from 0.01 to 4 $\mu$m, preferably in the range from 0.1 to 2 $\mu$m, in particular from 0.1 to 1 $\mu$m. The outer layer generally comprises laser pigment in an amount of from 0.01 to 10% by weight, preferably from 0.5 to 5% by weight, in particular from 0.8 to 3% by weight, based on the weight of the outer layer. If the concentration of the laser pigments is too low, only moderate absorption of the laser beam takes place, which results in poor seal strength. A high concentration of laser pigments does not achieve any additional effects with respect to the laser absorption. At high concentrations of coloured, metal and black pigments, a colour effect (grey effect) occurs which may be disadvantageous, but may be desired for some applications.

The laser pigments used are preferably metal pigments, such as aluminium or copper or tin pigments, or copper alloys, such as, for example, copper/zinc or copper/tin alloys, and black and coloured pigments, in particular carbon black or graphite, iron oxides, rutile mixed phases, ultramarines, spinels and zirconium silicates. Of the above-mentioned pigments, aluminium pigments, copper/zinc alloys and carbon black and graphite are particularly preferred. It has been found that in the case of carbon black a content of between 0.1 and 1.0% by weight, in the case of aluminium pigments a content of from 0.5 to 1.5% by weight and in the case of copper alloys a content of from 0.5 to 3.0% by weight, preferably from 1 to 2% by weight, based on the weight of the outer layer, are particularly advantageous.

The above-mentioned laser-absorbent metal, black or coloured pigments may, if desired, be employed in the form of a mixture with metal oxides, such as white pigments, for example titanium dioxide, aluminium oxide, silicon dioxides, corresponding metal hydroxides and metal oxide hydrates, and carbonates and silicates, such as, for example, calcium carbonate, aluminium silicate (kaolin clay), magnesium silicate (talc) or mica.

The pigment mixtures are advantageous since they firstly have a broad absorption spectrum, particularly in the wavelength range of the lasers used. Secondly, the high absorption capacity of the laser-absorbent metal, black or coloured pigments is utilized and at the same time the colourings by these laser-absorbent pigments are lightened again by means of corresponding white pigments. The light-scattering action of these white pigments intensifies the absorption properties of the metal, black and coloured pigments here and favours the build-up of heat in the outer layer.

The mixing ratio of white pigments and black, metal or coloured pigments can vary in broad ranges and enables an optimum absorption range to be set, depending on the laser used. In addition, the mixtures enable the desired hue of the film to be set. If desired, the mixture can be expanded to give a system comprising a plurality of components. For example, the ratio of white pigment to black, metal or coloured pigments is in a range from 5:1 to 1:5, with $TiO_2$ preferably being employed in the mixtures as lightening white pigment.

The pigment mixtures are mixed homogeneously by means of suitable methods, for example by ball grinding. At the same time, the suitable mean particle size and the suitable distribution width of the particle size can be set.

Furthermore, the pigments or pigment mixtures can be coated in order, for example, to produce improved adhesion to the polymer matrix and effectively to prevent cracks and vacuole formation, as are known of vacuole-initiating particles, during stretching. Coating, for example with resins or waxes, is particularly advantageous for the metal pigments, such as, for example, aluminium powder. This also prevents undesired dust formation, which may be hazardous to health and an explosion risk. In addition, these wax coatings improve the dispersibility of the pigments in the polymer (deagglomeration) and the good meterability of the pigments in masterbatch preparation. In general, commercially available metal pigments are already provided with wax and/or resin coatings of this type. Processes for the production of pigment coatings of this type are known in the prior art. In these, the pigments are wetted by these low-viscosity waxes or resins and, if desired, moistened through, which is advantageous for the dispersibility.

The pigments can have a spherical or columnar or leaf-shaped habit. The size, geometry and orientation of the particles may have an effect on the absorption behaviour to laser beams.

In a preferred embodiment, the polyolefin film according to the invention has a further second outer layer comprising polymers of olefins having from 2 to 10 carbon atoms which is applied to the side opposite the laser pigment-containing layer. In a preferred embodiment, this second outer layer is of such a composition that it absorbs essentially no radiation in the wavelength range of the lasers used for the sealing. For the production of the packaging according to the invention, it is essential that the laser beam passes through to the pigmented layer, so that adequate absorption can take place there.

Examples of olefinic polymers of the second outer layer are
propylene homopolymers
a copolymer of
ethylene and propylene or
ethylene and 1-butylene or
propylene and 1-butylene or
a terpolymer of
ethylene and propylene and 1-butylene or
a mixture or blend of two or more of the said homopolymers, copolymers and terpolymers,
particular preference being given for the second outer layer too to the polymers preferred above for the pigmented outer layer. In addition, polyethylenes, such as HDPE, MDPE or LDPE, if desired mixed with the propylene polymers for the second outer layer, are also suitable.

The above-described copolymers and/or terpolymers employed in the second outer layer generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the above-mentioned melt flow indices are measured at 230° C. and a force of 21.6 N (DIN 53 735).

If desired, additives, such as antistatics, neutralizers, lubricants and/or stabilizers, and, if desired, additionally antiblocking agents in effective amounts in each case can be added to the second outer layer in a manner known per se.

In a further embodiment, the second outer layer may also comprise a pigment which absorbs in the wavelength range of laser radiation. In an embodiment of this type, however, it is essential that these laser pigments of the second outer layer absorb in a different wavelength range than the laser pigment of the opposite outer layer. A film of this type can be employed particularly advantageously in combined processes in which on the one hand a seal seam is produced by means of a laser and in addition other processing steps, such as laser cutting, laser marking and/or laser perforation, are used by means of a second laser. In processes of this type, use is made of lasers which have different wavelengths.

The base layer of the multilayered film comprises essentially a polyolefin, preferably a propylene polymer, and, if desired, opacifying fillers as well as, if desired, further additives in effective amounts in each case. In general, the base layer comprises at least 50% by weight, preferably from 60 to 99% by weight, in particular from 70 to 98% by weight, of the polyolefin, in each case based on the weight of the layer.

Preferred polyolefins are propylene polymers. These propylene polymers comprise from 90 to 100% by weight, preferably from 95 to 100% by weight, in particular from 98 to 100% by weight, of propylene units and have a melting point of 120° C. or above, preferably from 150 to 170° C., and generally have a melt flow index of from 0.5 to 8 g/10 min, preferably from 2 to 5 g/10 min, at 230° C. and a force of 21.6 N (DIN 53 735). Isotactic propylene homopolymer having an atactic content of 15% by weight or less, copolymers of ethylene and propylene having an ethylene content of 10% by weight or less, copolymers of propylene with $C_4$–$C_8$-α-olefins having an α-olefin content of 10% by weight or less, terpolymers of propylene, ethylene and butylene having an ethylene content of 10% by weight or less and having a butylene content of 15% by weight or less are preferred propylene polymers for the core layer, particular preference being given to isotactic propylene homopolymer. The stated percentages by weight are based on the respective polymer.

Also suitable is a mixture of the said propylene homopolymers and/or copolymers and/or terpolymers and other polyolefins, in particular made from monomers having from 2 to 6 carbon atoms, where the mixture comprises at least 50% by weight, in particular at least 75% by weight, of propylene polymer. Suitable other polyolefins in the polymer mixture are polyethylenes, in particular HDPE, LDPE, VLDPE and LLDPE, where the proportion of these polyolefins in each case does not exceed 15% by weight, based on the polymer mixture.

For opaque embodiments, the opaque base layer of the film comprises fillers in an amount of at most 40% by weight, preferably from 1 to 30% by weight, in particular from 2 to 20% by weight, based on the weight of the opaque layer. For the purposes of the present invention, fillers are pigments and/or vacuole-initiating particles.

For the purposes of the present invention, pigments of the base layer are incompatible particles which result in essentially no vacuole formation on stretching of the film and generally have a mean particle diameter in the range from 0.01 to a maximum of 1 μm. The base layer generally comprises pigments in an amount of from 0.5 to 10% by weight, preferably from 1 to 8% by weight. Conventional pigments are, for example, aluminium oxide, aluminium sulphate, barium sulphate, calcium carbonate, magnesium carbonate, silicates, such as aluminium silicate (kaolin clay) and magnesium silicate (talc), silicon dioxide and titanium dioxide, of which white pigments, such as titanium dioxide, calcium carbonate, silicon dioxide and barium sulphate, are preferably employed.

"Vacuole-initiating fillers" are solid particles which are incompatible with the polymer matrix and result in the formation of vacuole-like cavities on stretching of the films. In general, the vacuole-initiating fillers have a minimum size of 1 μm. In general, the mean particle diameter of the particles is from 1 to 6 μm. Vacuole-initiating fillers are present in an amount of from 0.5 to 25% by weight, preferably from 1 to 15% by weight. Conventional vacuole-initiating fillers are inorganic and/or organic, polypropylene-incompatible materials, such as aluminium oxide, aluminium sulphate, barium sulphate, calcium carbonate, magnesium carbonate, silicates, such as aluminium silicate (kaolin clay) and magnesium silicate (talc), and silicon dioxide, of which calcium carbonate and silicon dioxide are preferably employed.

Suitable organic fillers are the polymers usually used which are incompatible with the polymer of the base layer, in particular those such as HDPE, copolymers of cyclic olefins, such as norbornene or tetracyclo-dodecene with ethylene or propene (COC), polyesters, polystyrenes, polyamides and halogenated organic polymers, preference being given to polyesters, such as, for example, polybutylene terephthalates and cyclo-olefin copolymers. For the purposes of the present invention, "incompatible materials or incompatible polymers" means that the material or polymer is present in the film in the form of separate particles or a separate phase.

The film according to the invention comprises at least one outer layer which comprises laser pigment. Overall, the film preferably has a three-, four- or five-layered structure. It is preferred for all other layers to be substantially transparent to the laser radiation used.

The thickness of the first laser pigment-containing outer layer(s) is generally greater than 0.1 µm and is preferably in the range from 0.3 to 6 µm. The second, opposite outer layer may be of the same or different thickness. Its thickness is preferably in the range from 0.3 to 3 µm.

The interlayer(s) may consist of the olefinic polymers described for the base layer. The interlayer(s) may comprise the conventional additives described for the individual layers, such as antistatics, neutralizers, lubricants and/or stabilizers, and, if desired, antiblocking agents. The thickness of the interlayer(s) is greater than 0.3 µm and is preferably in the range from 1.0 to 15 µm, in particular from 1.5 to 10 µm.

The total thickness of the polyolefin film according to the invention can vary within broad limits and depends on the intended use. It is preferably from 4 to 100 µm, in particular from 5 to 80 µm, preferably from 10 to 50 µm, with the base layer generally making up from about 40 to 100% of the total film thickness.

The invention furthermore relates to a process for the production of the polyolefin film according to the invention by the coextrusion process known per se, by the flat-film process or by the film blowing process.

The flat film process is carried out by coextruding the melts corresponding to the individual layers of the film through a flat-film die, taking off the resultant film over one or more roll(s) for solidification, subsequently stretching (orienting) the film, heat-setting the stretched film and, if desired, corona- or heat-treating the surface layer intended for the treatment.

The biaxial stretching (orientation) is carried out sequentially or simultaneously. Consecutive biaxial stretching, in which stretching is firstly carried out longitudinally (in the machine direction) and then transversely (perpendicular to the machine direction), is preferred. The simultaneous stretching can be carried out by the flat-film process, for example by means of LISIM® technology, or by the blowing process. The film production is described further using the example of flat-film extrusion with subsequent sequential stretching.

Firstly, the polymer or the polymer mixture of the individual layers is compressed and liquefied in an extruder, it being possible for the laser pigments and any other additives optionally added already to be present in the polymer or polymer mixture. The melts are then forced simultaneously through a flat-film die (slot die), and the extruded multilayered film is taken off over one or more take-off rolls at a temperature of from 10 to 100° C., preferably from 20 to 50° C., during which it cools and solidifies.

The film obtained in this way is then stretched longitudinally and transversely to the extrusion direction, which results in alignment of the molecule chains. The longitudinal stretching is advantageously carried out with the aid of two rolls running at different speeds corresponding to the target stretching ratio, and the transverse stretching is advantageously carried out with the aid of an appropriate tenter frame. The longitudinal stretching ratios are in the range from 4 to 8, preferably from 5 to 6. The transverse stretching ratios are in the range from 5 to 10, preferably from 7 to 9. The longitudinal stretching is preferably carried out at from 80 to 150° C. and the transverse stretching is preferably carried out at from 120 to 170° C.

The stretching of the film is followed by heat-setting (heat treatment) thereof, in which the film is held at a temperature of from 100 to 160° C. for from about 0.1 to 10 seconds. The film is subsequently wound up in a conventional manner by means of a wind-up device.

After the biaxial stretching, one or both surface(s) of the film is (are) optionally corona- or flame-treated by one of the known methods. The treatment intensity is generally in the range from 37 to 50 mN/m, preferably from 39 to 45 mN/m. The surface treatment of the film is described here using the following example of corona treatment.

In the corona treatment, an advantageous procedure is to pass the film between two conductor elements serving as electrodes, with such a high voltage, usually an alternating voltage (from about 5 to 20 kV and from 5 to 30 kHz), being applied between the electrodes that spray or corona discharges are able to occur. Due to the spray or corona discharge, the air above the film surface ionizes and reacts with the molecules of the film surface, causing the formation of polar inclusions in the essentially non-polar polymer matrix.

For the production of the packaging according to the invention, the films described above are processed, for example, in such a way that the two first pigmented outer layers of the film or the first pigmented outer layer and the second outer layer come into contact with one another. During subsequent laser irradiation, the laser beam passes through the other layers of the film until it hits the outer layers in contact, one or both of which are pigmented. In this or these outer layer(s), the incorporated pigments cause the radiation to be absorbed, resulting in warming, in a similar manner to the use of heat-sealing jaws. If the film webs are moved correspondingly or the laser beam is moved correspondingly, a seam is produced in this way, similar to a heat-seal seam, which is suitable for sealing the package.

Suitable for the generation of the laser beam are commercially available Nd:YAG, diode, eximer or $CO_2$ lasers, whose power is matched to the type of polymer, the processing speeds and the type of pigment in the outer layer. In principle, both pulsed and continuously operated lasers can be employed. Diode lasers in particular are particularly favourable owing to their robustness and wavelength in the near infrared. The width of the areas to be sealed can be set by varying the laser focus. A corresponding adjustment of the energy density of the laser is necessary. The laser beam generated is focused on the film to be sealed by aperture diaphragms and by means of suitable optics. Corresponding diaphragms make it possible to generate parallel laser beams in order to apply a plurality of weld and seal seams in a single operation. If desired, it is also possible here to integrate further processing steps, such as, for example, cutting and perforation, into this operation.

Surprisingly, it has been found that the interaction between laser and film can be controlled in such a way that on the one hand the laser beam is not already absorbed in the base layer, but instead passes through the other layers unhindered in the desired manner, but on the other hand the absorption cross section in the corresponding outer layer is sufficiently large to effect melting of the outer layer and thus to produce a seal seam. The absorption cross section here is, surprisingly, sufficiently large that the packaged product, in particular also heat-sensitive product, is not damaged by the laser beam.

The raw materials and films were characterized using the following measurement methods:

Melt Flow Index

The melt flow index was measured in accordance with DIN 53 735 at a load of 21.6 N and 230° C.

Mean Particle Size

The mean particle size was determined by image analysis. For this purpose, a sample is dispersed in water in order to separate the particles and applied to a glass slide. The sample is subsequently dried and studied under the scanning electron microscope. For this purpose, the individual particles are visualized as a gray shade image by means of a suitable setting of brightness and contrast. Over an area of 10 mm², the respective area of the separated particles is measured, and the particle diameter output as the diameter of a circle of equal area. These measurement values are classified by size ranges and indicate the distribution of the particle size. The mean particle diameter is determined as the mean of the distribution curve.

Melting Point

DSC measurement, maximum of the melting curve, heating rate 20° C./min.

The invention is explained below by means of working examples.

COMPARATIVE EXAMPLE 1

An opaque five-layered film having an asymmetrical structure and a total thickness of 33 μm was produced by coextrusion and subsequent stepwise orientation in the longitudinal and transverse directions. The outer layer A had a thickness of 1.2 μm and the underlying interlayer B had a thickness of 3.5 μm. The outer layer E had a thickness of 0.5 μm and the underlying interlayer D had a thickness of 0.1 μm. The layers had, in detail, the following composition:

Base layer:

| | |
|---|---|
| 87.0% by weight | of isotactic propylene homopolymer having a melting point of 159° C. and a melt flow index of 3.4 g/10 min |
| 9.0% by weight | of chalk masterbatch (Omyalite 90T) comprising 28% by weight of propylene homopolymer and 72% by weight of CaCO₃ |

Interlayers B and D

| | |
|---|---|
| 100% by weight | of isotactic propylene homopolymer having a melting point of 150° C. and a melt flow index of 3.4 g/10 min |

Outer layer A

| | |
|---|---|
| 100% by weight | of random C₂-C₃-copolymer comprising 5% by weight of ethylene and having a crystallite melting point of 125° C. and a melt flow index of 6.5 g/10 |

Outer layer E:

| | |
|---|---|
| 98.8% by weight | of random ethylene-propylene-butylene terpolymer having an ethylene content of 3% by weight and a butylene content of 7% by weight (remainder propylene) and having a crystallite melting point of [lacuna] and a melt flow index of [lacuna] |

The production conditions in the individual process steps were as follows:

| | | | |
|---|---|---|---|
| Extrusion: | Temperatures | Base layer: | 260° C. |
| | | Interlayers: | 255° C. |
| | | Outer layers: | 240° C. |
| | Temperature of the take-off roll: | | 20° C. |
| Longitudinal stretching: | Temperature: | | 110° C. |
| | Longitudinal stretching ratio: | | 5.5 |
| Transverse stretching: | Temperature: | | 160° C. |
| | Transverse stretching ratio: | | 9 |
| Setting: | Temperature: | | 150° C. |
| | Convergence: | | 5% |

EXAMPLE 1

A film was produced as described in Comparative Example 1. In contrast to Comparative Example 1, the film comprised 0.6% by weight, based on the weight of the layer, of carbon black in outer layer E. The remainder of the composition and the production conditions were unchanged compared with Comparative Example 1.

EXAMPLE 2

A film was produced as described in Comparative Example 1. In contrast to Comparative Example 1, outer layer E now comprised a mixture of carbon black and rutile (TiO₂) in the ratio (weight ratio) 1:1. The total content of carbon black and rutile in outer layer E was 0.6% by weight, based on the weight of outer layer E. The remainder of the composition and the production conditions were unchanged compared with Comparative Example 1.

EXAMPLE 3

A film was produced as described in Comparative Example 1. In contrast to Comparative Example 1, outer layer E now comprised 0.8% by weight of silver pigment, based on the weight of the layer, which consists of aluminium platelets. The remainder of the composition and the production conditions were unchanged compared with Comparative Example 1.

COMPARATIVE EXAMPLE 2

A film was produced as described in Comparative Example 1. In contrast to Comparative Example 1, the film comprised 2.5% by weight, based on the weight of the layer, of fine chalk (Socal) in outer layer E. The remainder of the composition and the production conditions were unchanged compared with Comparative Example 1.

COMPARATIVE EXAMPLE 3

A film was produced as described in Comparative Example 1. In contrast to Comparative Example 1, the film comprised 2.5% by weight, based on the weight of the layer, of a feldspar (Minex) in outer layer E. The remainder of the composition and the production conditions were unchanged compared with Comparative Example 1.

EXAMPLE 4

A film was produced as described in Comparative Example 1. In contrast to Comparative Example 1, the film comprised 1.0% by weight, based on the weight of the layer, of a copper alloy with zinc as gold pigment in outer layer E. The remainder of the composition and the production conditions were unchanged compared with Comparative Example 1.

EXAMPLE 5

Copolymer Outer Layer Variant

A film was produced as described in Comparative Example 1. In contrast to Comparative Example 1, the film comprised 0.8% by weight of silver pigment, based on the layer, in outer layer A. The remainder of the composition and the production conditions were unchanged compared with Comparative Example 1.

The films produced as described in the examples and comparative examples were laid one on top of the other in two layers on a metal plate. The film layers were arranged in such a way that the film located directly on the metal plate lay on the metal plate with the unpigmented outer layer (outer layer A for CE 1 to 3 and Example 1 to 4; outer layer E for Example 5) and the opposite pigmented outer layer was in contact with the second film layer. The second film layer made from the same film was arranged in such a way that its pigmented outer layer was in contact with the pigmented outer layer of the first film layer. The two pigment-containing outer layers were thus in contact. In addition, a transparent polyethylene plate was laid on the two film layers and pressed the two film layers gently against one another. This arrangement was then irradiated both continuously by means of a diode laser at a wavelength of 980 nm and with a laser power of from 15 to 25 W and also by means of a $CO_2$ laser (10600 nm) with a power of from about 50 to 80 W with a pulse duration of from 10 to 14 $\mu$s. During the irradiation, the film layers were pulled through the two plates at a constant speed with a gentle contact pressure. The speed was varied in a range of 0.4–4 m/min.

On use of a $CO_2$ laser, a line-shaped seal seam with good strength was formed in the case of all films. At the same time, deformation of the seal seam caused by melting of the entire film and damage to the film surface are evident.

The irradiation with a diode laser likewise caused a line-shaped "seal seam" in the case of the carbon black- and aluminium-pigmented films in accordance with the examples, while in the case of the samples in accordance with the comparative examples, the laser beam passed through the films without producing any evident effect. A somewhat higher laser power was necessary to produce a sufficiently strong seal seam in the case of the films according to Example 5. Comparison of Example 3 with Example 5 shows that a higher laser energy is necessary to achieve a specified seal seam strength due to the use of a higher-melting sealing raw material (copolymer).

In detail, it was observed that the films in accordance with the examples exhibited good adhesive strength in the welded area. Through slight changes in the feed rate of the films, it was possible to achieve a variation in the seal seam width.

What is claimed is:

1. A packaging made of a multilayered, oriented polyolefin film which film comprises a base layer and at least one first outer layer, wherein the polyolefin film comprises in the first outer layer an additive which has an absorption in the wavelength range of lasers such that, on local irradiation of the film with a laser, a temperature increase occurs in the area of the irradiation such that the polyolefin of the first outer layer softens or melts therein in the irradiated area and bonds to a further layer on cooling, wherein the film is transparent.

2. A packaging made of a multilayered, oriented polyolefin film which film comprises a base lever and at least one first outer layer, wherein the polyolefin film comprises in the first outer layer an additive which has an absorption in the wavelength range of lasers such that, on local irradiation of the film with a laser, a temperature increase occurs in the area of the irradiation such that the polyolefin of the first outer layer softens or melts therein in the irradiated area and bonds to a further layer on cooling, wherein the film has an opaque base layer which comprises vacuole-initiating fillers.

3. Packaging according to claims 1 or 2, wherein the outer layer comprises at least about 80% by weight of a propylene polymer.

4. Packaging according to claim 3, wherein the propylene polymer is an ethylene-propylene copolymer or a terpolymer.

5. Packaging according to claims 1 or 2 wherein the additive is present in an amount of from about 0.01 to about 10% by weight, based on the weight of the first outer layer, and the mean particle diameter is from about 0.01 to about 4 $\mu$m.

6. Packaging according to claims 1 or 2 wherein the thickness of the first outer layer is from about 0.1 to about 5 $\mu$m.

7. Packaging according to claims 1 or 2, wherein the additive is a laser-absorbent metal, black or coloured pigment.

8. Packaging according to claims 1 or 2 wherein the film has, on the opposite side, a second outer layer which comprises an additive which absorbs radiation in the wavelength range of a laser, where the additives of this second outer layer absorb in a different wavelength range than the additives of the first outer layer.

9. Packaging according to claims 1 or 2, wherein the film only comprises an additive which absorbs radiation in the wavelength range of a laser in the first outer layer and in no other layer.

10. A multilayered, oriented polyolefin film which comprises a base layer and at least one first outer layer, wherein the first outer layer comprises a pigment comprising a copper alloy.

11. Multilayered, oriented polyolefin film, according to claim 10, wherein the copper alloy is a copper/zinc alloy, and the pigment is in an amount of from about 0.5 to about 3% by weight, based on the weight of the outer layer.

12. Multilayered, oriented polyolefin film, according to claim 10, wherein the other layers of the film do not comprise any pigment which absorbs radiation in the wavelength range of a laser.

13. Multilayered, oriented polyolefin film, according to claim 10, wherein the first outer layer additionally comprises a white pigment.

14. Multilayered, oriented polyolefin film, according to claim 13, wherein the white pigment is $TiO_2$.

15. Multilayered, oriented polyolefin film, according to claim 10, wherein the base layer comprises fillers in an amount of up to about 40% by weight.

16. Multilayered, oriented polyolefin film, according to claim 15, wherein the filler is $CaCO_3$, $TiO_2$, polyethylene terephthalate or polybutylene terephthalate.

17. A process for the production of a packaging made of a multilayered, oriented polyolefin film which comprises a base layer and at least one first outer layer, wherein the polyolefin film comprises in the first outer layer an additive which absorbs in the wavelength range of lasers, which process comprises the steps of irradiating the polyolefin film with a laser such that a local temperature increase occurs in the area of the irradiation, and the polyolefin of the first outer layer softens or melts therein in the irradiated area and bonding said polyolefin to a further layer on cooling.

18. Process according to claim 17, wherein the polyolefin film has a second, opposite outer layer and has in this second outer layer an additive which absorbs in the wavelength range of a laser, further comprising the step of producing a seam for sealing the packaging by means of a laser having a first wavelength range and then marking and/or cutting and/or perforating the film by means of a second laser having another wavelength range which is different from that of the first laser.

19. Process according to claim 18, wherein the working by means of a plurality of lasers of different wavelength is carried out simultaneously.

20. A process for the production of packaging comprising a container with a lid, where the lid lies on a container rim and where this lid is made of a multilayered, oriented polyolefin film, where the film comprises a base layer and at least on first outer layer and where this first outer layer is in contact with the container rim, wherein the film in the first outer layer comprises an additive which has an absorption in the wavelength range of a laser which process comprises the steps of such that, irradiating the film with this laser, such that a temparature increase occurs In the first outer layer and the polyolefin of the first outer layer softens or melts in this area and bonding said film to the container rim on cooling.

\* \* \* \* \*